Patented Oct. 2, 1945

2,385,815

UNITED STATES PATENT OFFICE 2,385,815

DYESTUFFS

John David Kendall and Douglas James Fry, Ilford, England, assignors to Ilford Limited, Ilford, England, a British company No Drawing. Application August 21, 1941, Serial No. 407,838. In Great Britain October 16, 1940

15 Claims. (Cl. 260—240)

This invention relates to the production of dyestuffs suitable for sensitising gelatino-silver halide photographic emulsions.

According to the invention, photographic sensitising dyestuffs are produced by condensing an alkyl or aralkyl quaternary salt of a compound of the general formula I (I)

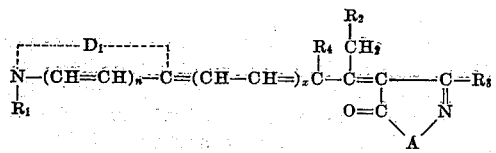

(where $R_1$ is an alkyl or aralkyl group, $R_2$ and $R_4$ are hydrogen or alkyl, aralkyl or aryl groups, $R_3$ is hydrogen or an alkyl, aralkyl, aryl or heterocyclic group, A is a divalent atom or group, $D_1$ is the residue of a heterocyclic nucleus, $n$ is nought or 1 and $x$ is nought, 1, 2 or 3) with the quaternary salt of a heterocyclic nitrogen compound containing either a reactive thioether or seleno-ether group (including an aryl-, alkyl- or aralkyl-thioether or -seleno-ether group) or $\alpha$—(CH=CH)m.NH$_2$ group where $m$ is 1, 2 or 3 (including N-acyl, N-aryl and N-acylaryl substituted groups of this type) in the $\alpha$ or $\gamma$ position to the quaternary nitrogen atom.

The grouping —(CH=CH)m.NH$_2$ is hereinafter referred to as the aminovinyl type of group.

The alkyl or aralkyl quaternary salt of the compound of general Formula I may be, for example, a methyl-, ethyl- or higher alkyl, or benzyl or naphthyl-methyl chloride, bromide, iodide, sulphate or perchlorate. Preferably, however, it is an alkyl-p-toluene sulphonate compound and this may most conveniently be produced by fusing a compound of general Formula I with an alkyl-p-toluene sulphonate, e. g. methyl or ethyl-p-toluene sulphonate.

The group A may be, for example, an oxygen atom or an —NR$_5$ group where $R_5$ is a hydrogen atom or an alkyl, aryl, aralkyl or heterocyclic group.

As indicated above, $R_1$, $R_2$, $R_3$, $R_4$ and $R_5$ may be alkyl or aralkyl groups; examples are methyl, ethyl, propyl, butyl and higher alkyl groups, benzyl and naphthyl-methyl groups. $R_2$, $R_3$, $R_4$ and $R_5$ may be aryl groups and examples are phenyl and naphthyl groups. Such aryl groups may themselves be substituted, e. g. by alkyl, amino, hydroxy, alkoxy and oxyalkyl groups and by halogen atoms. Either or both of the groups $R_3$ and $R_5$ may be heterocyclic groups, e. g. furyl groups.

The residue $D_1$ in general Formula I may be the residue of a heterocyclic nucleus of any of the types commonly employed in the production of cyanine dyes, e. g. a substituted or unsubstituted thiazole, thiazoline, oxazole, oxazoline, selenazole, selenazoline, pyridine, quinoline, indolenine, diazine (e. g. pyrimidine) thiodiazole or quinazoline nucleus, including the corresponding substituted or unsubstituted polycyclic nuclei such as the benzthiazole, naphthathiazole and anthrathiazole nuclei and also the nuclei of the diazines described in British Patent No. 425,609.

The production of compounds of the general Formula I may be effected by various processes, e. g. the process as described in application S. No. 297,769, filed October 3, 1939 now U. S. Patent No. 2,265,908, granted December 9, 1941, in application S. No. 331,674, filed April 25, 1940, and in application S. No. 407,841 filed on even date herewith.

Any of the known types of heterocyclic quaternary nitrogen compounds containing the specified reactive thio-ether, selenoether or aminovinyl types of groups commonly employed in the manufacture of cyanine dyestuffs may be employed in the present invention. Examples are the quaternary salts of the various heterocyclic compounds listed above.

The general course of the chemical reaction underlying the process of this invention may be set out as follows. The initial quaternary salt of the compound of general Formula I—the alkyl or aralkyl salt used in forming the quaternary salt being designated as $R_6X$—has the formula:

(II)

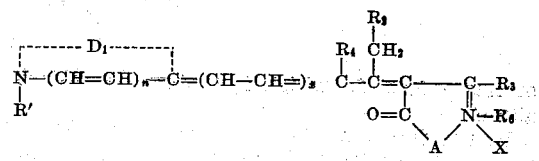

which is tautomeric with:

(III)

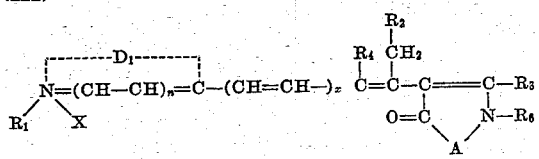

Assuming for the sake of simplicity of explanation that the quaternary salt has the Formula II, the condensation reaction where the second reagent contains a reactive thioether group and the quaternary alkyl or aralkyl salt group is an $R_7Y$ group, proceeds as follows:

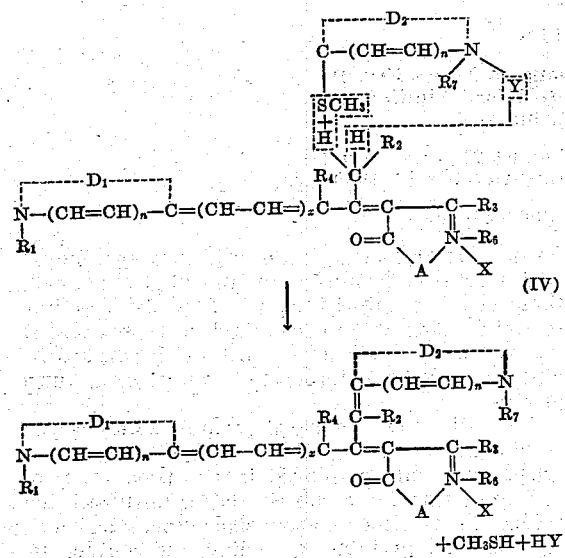

It will be appreciated that by assuming the alternative Formula III for the intial quaternary salt a slightly different formula for the product is obtained and it is to be understood that the products may have a formula different from, but tautomeric with, the formula set forth above.

If, instead of a thioether type of group, the second reagent contains a reactive aminovinyl type of group, the product differs from that shown in general Formula IV above by the addition of one or more pairs of methine groups between the added nucleus and the

grouping of the residue of the initial compound, i. e. it has the following formula:

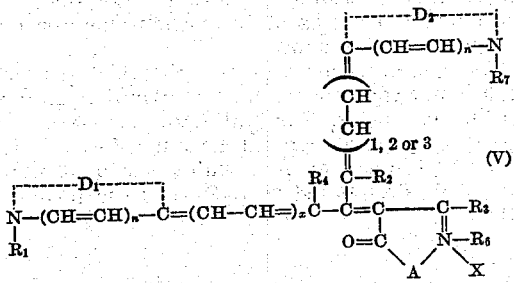

or has a formula which is tautomeric with the above.

In the foregoing formulae, $D_2$ represents the residue of a heterocyclic nucleus, e. g. one of those mentioned above, $R_6$ and $R_7$ are alkyl or aralkyl groups and X and Y are acid residues and $n$ is nought or 1. Other symbols have the meanings previously assigned to them.

In carrying out the process of this invention, it is not always necessary to isolate the quaternary salt of the compound of Formula I. Thus by condensing a compound of the general Formula I with the desired second heterocyclic nitrogen compound and sufficient alkyl salt or aralkyl salt to convert both compounds to quaternary salts, the reaction may be effected in one stage. Preferably an excess of alkyl or aralkyl salt over mere sufficiency is employed.

Again, since the initial compound of general Formula I may be prepared by condensing a suitable intermediate with a quaternary salt of a heterocyclic nitrogen compound as described in application S. No. 331,674, the formation of those dyestuffs of the present invention in which of the three nuclei one is a pyrazolone nucleus and the other two are of the same nature as one another, e. g. both benzthiazole nuclei, may be effected in a single operation by condensing together a suitable pyrazolone derivative of the type described in application S. No. 331,674, e. g a compound of the general formula:

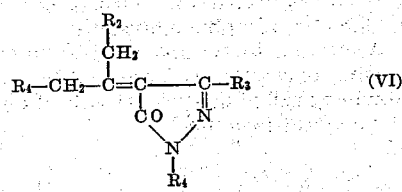

($R_2$, $R_3$, $R_4$ and $R_5$ having the meanings assigned to them above) two molecular equivalents of a heterocyclic compound containing a reactive thioether, solenoether or aminovinyl type of group and a sufficiency of an alkyl salt or an arlkyl salt.

It will be understood that in the processes described in each of the two last preceding paragraphs, the initial quaternary salt of the compound of Formula I necessary to the process of this invention is formed during the reaction, and reacts with the secondary reagent in the manner set forth above.

The condensation process of the invention is preferably completed in the presence of an acid binding agent, e. g. pyridine, piperidine, triethylamine, sodium acetate or potassium carbonate. Where the heterocyclic nitrogen compound contains a reactive aminovinyl type of group, the condensation is preferably completed in the presence of an alcoholic solution of sodium acetate.

The following examples illustrate the invention:

Example I

Preparation of the dyestuff of the probable formula:—

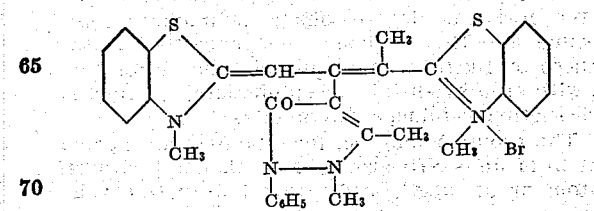

0.38 gms. of α-(2-methyl-dihydrobenzthiazolylidene)-1:4'-isobutylidene-1'-phenyl - 3'-methyl-5'-pyrazolone, 0.62 gms. of 1-methylthiol-benzthiazole and 1.5 gms. of methyl-p-toluene sulphonate were mixed and heated together for four hours at 140° C. on an oil bath. The mixture was cooled and there was then added 10 ccs. of ethyl alcohol and 0.8 gms. of anhydrous sodium acetate. The mixture was then refluxed for twenty minutes and then poured into potassium bromide solution. The resulting mixture, after dilution with water was filtered to collect the precipitated dye, the precipitate being washed with alcohol and ether. On recrystallisation from ethyl alcohol, the product was obtained as green crystals, melting at 230° C. with decomposition. This dyestuff included in a gelatino silver bromide photographic emulsion imparts a band of sensitivity extending to about 6700 A, with a maximum at about 6200 A

Example II

Preparation of the dyestuffs of the probable formula:—

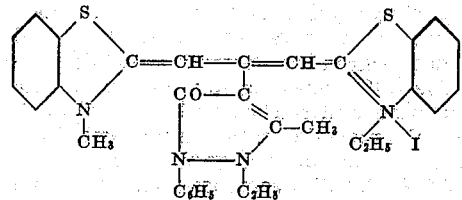

0.36 gm. of 2-methyl-dihydrobenzthiazolylidene-1:4'-iso propylidene-1'-phenyl-3'-methyl-5'-pyrazolone, 0.6 gm. of 1-methylthiol-benzthiazole and 2.0 gms. of ethyl-p-toluene sulphonate were fused together for three hours at 140° C. on an oil bath. The mixture was then cooled and there was then added 10 ccs. of ethyl alcohol and 0.8 gm. of anhydrous sodium acetate. The mixture was then refluxed for twenty minutes, poured into potassium iodide solution and diluted with water. A sticky precipitate formed, which hardened on treatment with spirit. The precipitate was boiled with methyl alcohol, filtered, and washed with methyl alcohol, hot benzene and ether. The product was thus obtained as green crystals having a gold lustre, melting at 280° C. with decomposition.

This dyestuff is a powerful sensitiser; when incorporated in a gelatino silver bromide photographic emulsion it imparts a band of sensitivity extending to about 6800A with a sharp maximum at about 6300A.

Example III

Preparation of the dyestuff of the probable formula:—

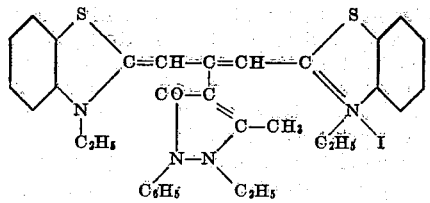

1.1 gms. of α-(2-ethyldihydrobenzthiazolylidene)-1:4'-isopropylidene-1'-phenyl-3'-methyl-5'-pyrazolone, 1.1 gms. of 1-methylthiol-benzthiazole and 3.5 gms. of ethyl-p-toluene sulphonate were mixed and heated together for three-and-a-half hours at 160° C. The mixture was then cooled, heated on a water bath with 20 ccs. of pyridine for fifteen minutes and then refluxed for thirty minutes. The mixture was then poured into potassium iodide solution and the precipitate thus formed was separated by filtration and washed with ethyl alcohol and ether. On recrystallisation from methyl alcohol the product was obtained as olive green needles, melting at 248° C. with decomposition. This dyestuff when incorporated in a gelatino silver bromide photographic emulsion imparts a band of sensitivity extending to about 6500Å with a maximum at about 6200 Å.

Example IV

Preparation of the dyestuff of the probable formula:—

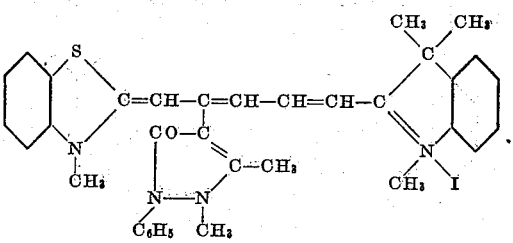

1 gm. of 2-methyldihydrobenzthiazolylidene-1.4'-iso-propylidene-1'-phenyl-3'-methyl-5'-pyrazolone and 3 gms. of methyl-p-toluene sulphonate were mixed together and heated for three hours at 160° C. The cooled mixture was then dissolved in 20 ccs. of ethyl alcohol and poured into potassium iodide solution. The quaternary salt thus formed crystallised out on standing and was removed by filtration and washed with ethyl alcohol and ether. It consisted of yellow needles melting at 249° C. with decomposition.

0.49 gm. of the quaternary salt prepared as above, 0.45 gm. of 2-ω-acetanilidovinyl-3.3-dimethyl-indolenine methiodide and 7.5 ccs. of pyridine were mixed together and heated for four hours on a water bath. The solution was then poured into potassium iodide solution and diluted with water. The dyestuff separated on standing and was removed by filtration and washed with ethyl alcohol and ether. The product was thus obtained as green crystals melting at 248° C. with decomposition. This dyestuff when incorporated in a gelatino silver bromide photographic emulsion imparts a band of sensitivity with a maximum at about 6800 Å.

Example V

Preparation of the dyestuff of the probable formula:

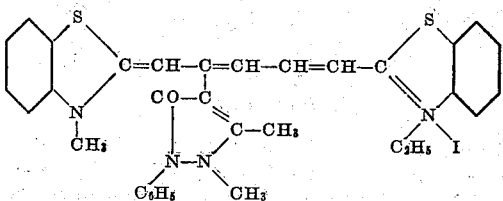

0.5 gm. of 2-methyl-dihydrobenzthiazolylidene-1.4'-isopropylidene-1'-phenyl-3'-methyl-5'-pyrazolone and 3 gms. of methyl-p-toluene sulphonate were heated together for one hour at 160° C. The mixture was then cooled and there was then added 0.62 gm. of 1-ω-acetanildovinyl-benz-thiazole ethiodide and 10 ccs. of pyridine. The mixture was then heated on a water bath for one hour, poured into potassium iodide solution and diluted with water. Solid separated out and was removed by filtration. On recrystallisation of this solid from methyl alcohol, impurities first crystallising were filtered off; the filtrate was then concentrated and yielded the desired dyestuff as dark green crystals, melting at 194° C. with decomposition. (Instead of using 10 ccs. of pyridine as set forth above there may be employed 10 ccs. of ethyl alcohol containing 0.8 gm. of sodium acetate). This dyestuff when incorporated in a gelatino-silver bromide photographic emulsion imparts a band of sensitivity between 6800 Å and 7400 Å with a maximum at about 7200 Å.

*Example VI*

Preparation of the dyestuff of the probable formula:

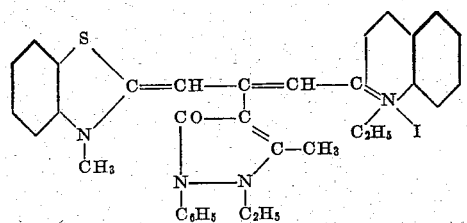

1.2 gms. of 2-methyl-dihydrobenzthiaolylidene-1.4′ - isopropylidene-1′-phenyl-3′-methyl-5′-pyrazolone and 1.2 gms. of 2-methylthiol-quinoline and 6 gms. of ethyl-p-toluene sulphonate were mixed together and heated for 2½ hours at 140° C. The mixture was then heated for a further half-an-hour at 170° C. and then cooled. Thereupon, 10 ccs. of pyridine were added and the mixture heated first for one hour on a water bath and then under reflux for 1½ hours. The solution was then poured into potassium iodide solution and diluted with water. The dyestuff crystallised out and was separated by filtration and washed with ethyl alcohol, ether and hot benzene. On recrystallisation from ethyl alcohol the product was obtained as bronze crystals melting at 197° C. with decomposition. This dyestuff when incorporated in a galatino silver bromide photographic emulsion imparts a band of senstivity extending to about 7200 Å with a maximum at about 700 Å.

*Example VII*

Preparation of the dyestuff of the probable formula:

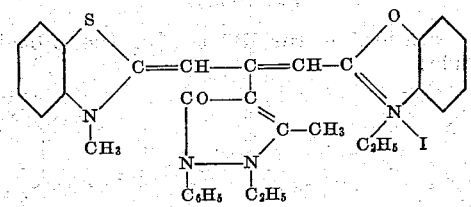

1.2 gms. of 2 - methyldihydrobenzthiazolylidene-1.4′ - isopropylidene-1′-phenyl-3′-methyl-5′-pyrazolone, 1.1 gms. of 1-methylthiol-benzoxazole and 5 gms. of ethyl-p-toluene sulphonate were mixed and heated for six hours at 160° C. The mixture was then cooled and 15 ccs. of pyridine were added. The mixture was then refluxed for half-an-hour, poured into potassium iodide solution and diluted with water. The dyestuff separated out and was removed by filtration and washed with ethyl alcohol, hot benzene and ether. On recrystallisation from methyl alcohol, the product was obtained as small gold crystals melting at 198° C. with decomposition at above 210° C. This dyestuff when incorporated in a gelatino silver bromide photographic emulsion imparts a band of sensitivity extending to about 6300 Å with a maximum at about 6000 Å.

*Example VIII*

Preparation of the dyestuff of the probable formula:

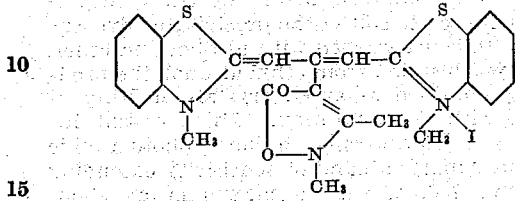

0.95 gm. of 2 - methyldihydrobenzthiazolylidene-1:4′-isopropylidene - 3′ - methyl-isoxazolone, 1.2 gms. of 1-methylthiolbenzthiazole and 5 gms. of methyl-p-toluene sulphonate were heated together for 2¼ hours at 160° C. and then cooled. 20 ccs. of pyridine were then added to the mixture and the mixture refluxed for half-an-hour and then poured into potassium iodide solution. The dyestuffs separated out and was removed by filtration and washed with ethyl alcohol and ether. On recrystallisation from methyl alcohol the product was obtained as purple crystals, melting at 242° C. with decomposition. This dyestuff when incorporated in a gelatino silver bromide photographic emulsion imparts a band of sensitivity extending to about 6700 Å with a sharp maximum at about 6500 Å.

*Example IX*

Preparation of the dyestuff of the probable formula:

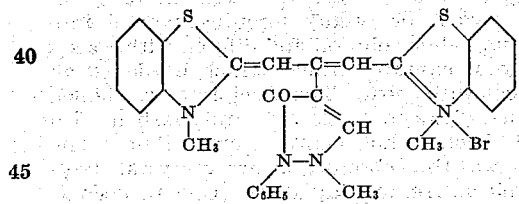

0.2 gm. of 2-methyl-dihydrobenzthiazolylidene-1:4′-isopropylidene-1′-phenyl-5′-pyrazolone, 0.21 gm. of 1-methyl thiol-benzthiazole and 1.5 gms. of methyl-p-toluene sulphonate were mixed and heated together for three hours at 160° C. The mixture was cooled, 15 ccs. of pyridine were added, and the mixture was then warmed for fifteen minutes on a water bath and then refluxed for thirty minutes. The mixture was then poured into water, filtered and a solution of potassium bromide was then added to the filtrate whereupon the desired dyestuff separated out and was removed by filtration. This dyestuff was boiled out with benzene, filtered and washed with ethyl alcohol. It consisted of green crystals melting at 243° C. with decomposition.

This dyestuff when incorporated in a gelatino-silver bromide photographic emulsion imparts a band of sensitivity extending to about 6800 Å with maxima at about 6100 Å and 6600 Å.

*Example X*

This example illustrates an alternative method of preparing the dyestuff of Example III, starting with a pyrazolone intermediate and effecting in one operation the formation of a compound of the general Formula I, the formation of the quaternary salt of this compound, the formation of a quaternary salt of the secondary reagent and the condensation of the two quaternary salts to form a dyestuff of this invention. 5.3 gms. of 1-phenyl-3-methyl-4-isopropylidene-5-pyrazolone, 13.6 gms. of 1-methylthiol-benzthiazole and 30 grams of methyl-p-toluene sulphonate were mixed together and heated for three hours at 130–140° C. The mixture was then colled, 100 ccs. of pyridine were added, and the mixture was heated first for ten minutes on a water bath and then for thirty minutes under reflux. The solution was then poured into potassium iodide solution. The dyestuff separated from the cooled solution and was removed by filtration and washed with ethyl alcohol and ether, followed by recrystallisation from methyl alcohol.

The following are examples of additional dyestuffs which may be made by the general processes indicated in the preceding Examples 1–10. In all these examples the parts given are parts by weight.

*Example XI*

Preparation of the dyestuff of the probable formula:

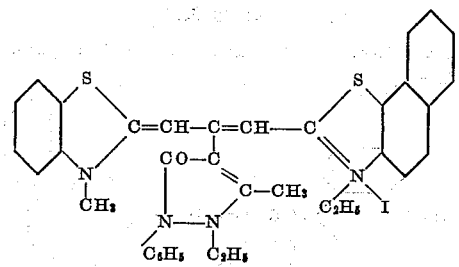

This dyestuff was obtained by reaction between 0.72 part 2-methyldihydrobenzthiazolylidene-1.4'-isopropylidene-1'-phenyl-3'-methyl - 5' - pyrazolone, 0.92 part 1-methylthiol-5:6-naphthathiazole and 3.5 parts ethyl-p-toluene sulphonate. The dyestuff was converted into the iodide salt by pouring a solution of it into potassium iodide solution. It consisted of small slate-blue crystals melting at 281° C. with decomposition. Incorporated in a gelatino silver iodobromide emulsion it imparts a band of sensitivity extending to 6700 Å with a maximum of 6500° A.

*Example XII*

Preparation of the dyestuff of the probable formula:

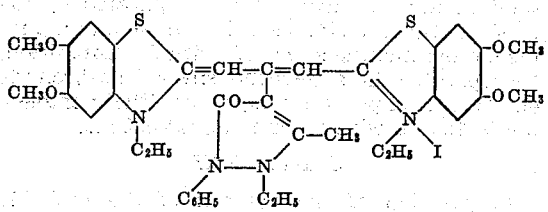

This dyestuff was obtained by reaction between 1.07 parts 1-phenyl-3-methyl-4-isopropylidene-5-pyrazolone, 3.63 parts 1 - methylthiol-4:5-dimethoxy-benzthiazole and 6 parts ethyl-p-toluenesulphonate. The dyestuff was converted into the iodide salt by pouring a solution of it into potassium iodide solution. It consisted of emerald-green crystals melting at 285° C. with decomposition. Incorporated in a gelatinosilver iodobromide emulsion it imparts a band of sensitivity extending to 7100 Å with a maximum at 6700 Å.

*Example XIII*

Preparation of the dyestuff of the probable formula:

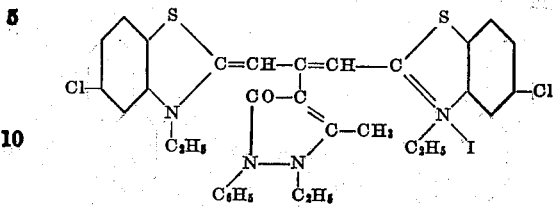

This dyestuff was obtained by reaction between 1.07 parts 1-phenyl-3-methyl-4-isoproplyidene-5-pyrazoline, 4.31 parts 1-methyl-thiol-4-chlorbenzthiazole and 6 parts of ethyl-p-toluene-sulphonate. The dyestuff was converted into the iodide salt by pouring a solution of it into potassium iodide solution. It consisted of bronze crystals melting at 233° C. with decomposition. Incorporated in a gelatino silver iodo-bromide emulsion it imparts a band of sensitivity extending to 6500 Å with a maximum at 6200 Å.

*Example XIV*

Preparation of the dyestuff of the probable formula:

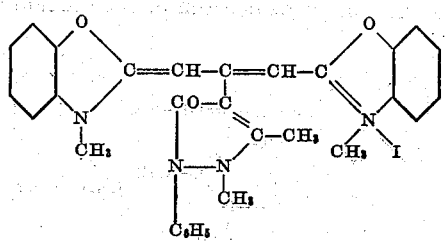

This dyestuff was obtained by reaction between 2.14 parts 1-phenyl-3-methyl-4-isopropylidene-5-pyrazolone, 6.6 parts 1-methylthiol-benzoxazole and 15 parts methyl-p-toluene sulphonate. The dyestuff was converted into the iodide salt by pouring a solution of it into potassium iodide solution. It consisted of scarlet crystals melting at 270° C. with decomposition. Incorporated in a gelatino silver iodo-bromide emulsion it imparts a band of sensitivity extending to 6100 Å with a maximum at 5700 Å.

*Example XV*

Preparation of the dyestuff of the probable formula:

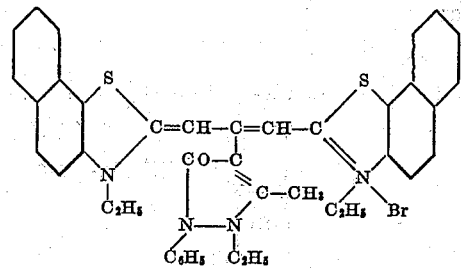

This dyestuff was obtained by reaction between 1.07 parts 1-phenyl-3-methyl-4-isopropylidene-5-pyrazolone, 4.62 parts 1-methylthiol-5:6-naphthathiazole and 6 parts ethyl-p-toluene sulphonate. The dyestuff was converted into the bromide salt by pouring a solution of it into potassium bromide solution. It consisted of green crystals melting above 300° C. Incorporated in a gelatino silver iodo bromide emulsion it imparts a band of sensitivity extending to 7000 Å with a maximum at 6700 Å.

Example XVI

Preparation of the dyestuff of the probable formula:

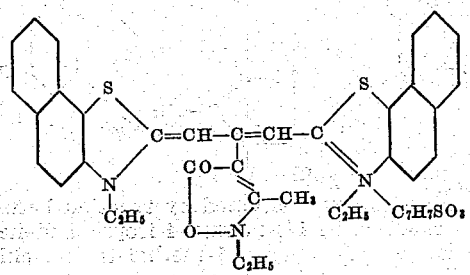

This dyestuff was obtained by reaction between 0.46 part 3-methyl-4-isopropylidene-5-isoxazolone, 2.31 parts 1-methylthiol-5:6-naphthathiazole and 4 parts ethyl-$p$-toluene sulphonate. It consisted of green crystals melting at 248° C. with decomposition. Incorporated in a gelatino silver iodo-bromide emulsion it imparts a band of sensitivity extending to 7100 Å with a maximum at 6750 Å.

Example XVII

Preparation of the dyestuff of the probable formula:

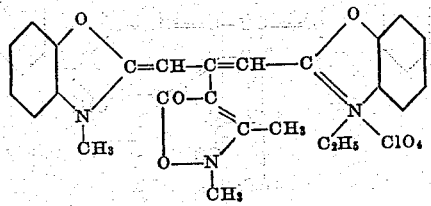

This dyestuff was obtained by reaction between 0.7 part 3-methyl-4-isopropylidene-5-isoxazolone, 3.5 parts 1-methylthiol-benzoxazole and 4 parts methyl-$p$-toluene-sulphonate. The dyestuff was converted into the perchlorate salt by pouring a solution of it into potassium perchlorate solution. It consisted of orange crystals melting at 272° C. with decomposition. Incorporated in a gelatino silver iodo-bromide emulsion it imparts a band of sensitivity extending to 6000 Å with a maximum at 5750 Å.

Example XVIII

Preparation of the dyestuff of the probable formula:

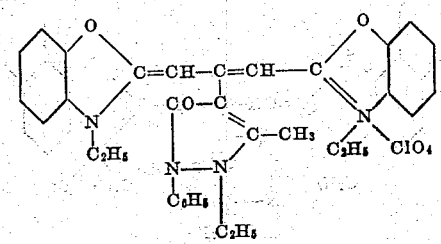

This dyestuff was obtained by reaction between 1.07 parts 1-phenyl-3-methyl-4-isopropylidene-5-pyrazolone, 3.3 parts 1-methylthiol-benzoxazole and 8 parts ethyl-$p$-toluene sulphonate. The dyestuff was converted into the perchlorate salt by pouring a solution of it into potassium perchlorate solution. It consisted of scarlet crystals melting at 285° C. with decomposition. Incorporated in a gelatino silver iodo-bromide emulsion it imparts a band of sensitivity extending to 6000 Å with a maximum at 5700 Å.

Example XIX

Preparation of the dyestuff of the probable formula:

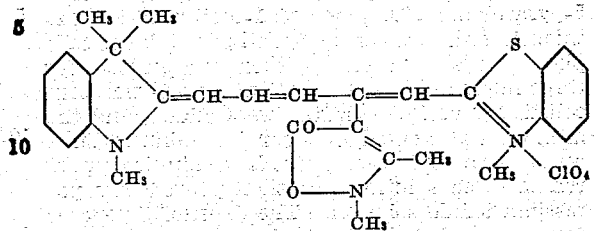

This dyestuff was obtained by reaction between 0.9 part α-(1:3:3-trimethylindolylidene)--methyl-2:4'-butenylidene-3'-methyl - 5' - isoxazolone, 2.7 parts 1-methylthiol-benzthiazole and 4.5 parts methyl-$p$-toluene sulphonate. The dyestuff was converted into the perchlorate salt by pouring a solution of it into potassium perchlorate solution. It consisted of bronze crystals melting at 200° C. with decomposition. Incorporated in a gelatino silver iodo-bromide emulsion this dyestuff imparts a band of sensitivity with a maximum at about 6700 Å.

Example XX

Preparation of the dyestuff of the probable formula:

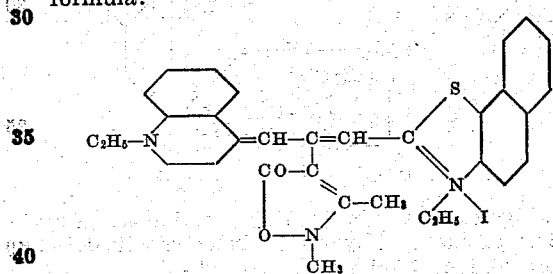

2.06 parts 2-ethyl - 5:6 - naphthathiazolylidene-1:4' - isopropylidene-3-methyl-5-isoxazolone and 5 parts methyl-$p$-toluene sulphonate were mixed together and fused for three hours at 130–150° C. The product was cooled, dissolved in alcohol and then poured into potassium iodide solution. The quaternary salt thus obtained was washed with alcohol, and 0.98 part thereof were added to a fusion mixture of 0.5 part N-ethyl-quinoline-4-thione and 0.6 part ethyl-$p$-toluene sulphonate. 15 ccs. of ethyl alcohol were added and the mixture refluxed gently for 25 minutes. The mixture was then poured into potassium iodide solution and the dyestuff was separated by filtration, and recrystallised. It consisted of a purple powder melting at 203° C. with decomposition. Incorporated in a gelatino silver iodo-bromide emulsion it imparts a band of sensitivity extending to 7600 Å with a maximum at 6900 Å.

Example XXI

Preparation of the dyestuff of the probable formula:

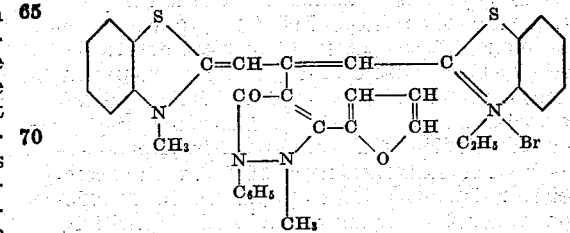

This dyestuff was obtained by reaction between 0.41 part 2 - methyldihydrobenzthiazolylidene - 1:4'-isopropylidene-1'-phenyl-3'-furyl-5'-pyrazolone, 0.56 part 1-methylthiolbenzthiazole and 2 parts ethyl-p-toluene sulphonate. The dyestuff was converted into the bromide salt by pouring a solution of it into potassium bromide solution. It consisted of purple crystals melting at 244° C. with decomposition.

*Example XXII*

Preparation of the dyestuff of the probable formula:

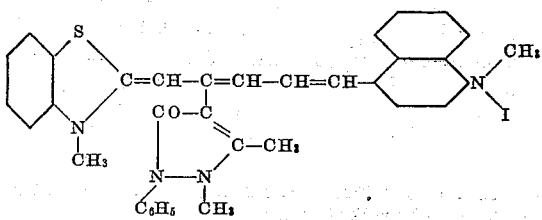

0.5 part of the quaternary salt prepared as in Example IV 0.43 part of 4-acetanilidovinyl quinoline methiodide and 4 parts ethyl alcohol were mixed together and boiled, and 0.1 part of anhydrous sodium acetate was added. The whole mixture was refluxed for ten minutes and then poured into potassium iodide solution. The dyestuff separated and was obtained as deep blue crystals melting at 205° C. with decomposition. Incorporated in a gelatino silver iodo-bromide emulsion it imparts a band of sensitivity extending to 8600 Å with maxima at about 7500 Å and 8100 Å.

*Example XXIII*

Preparation of the dyestuff of the probable formula:

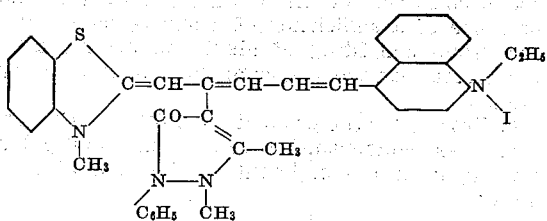

This dyestuff was prepared as in Example XXII but using 0.44 part of 4-acetanilidovinyl quinoline ethiodide in place of the methiodide. The dyestuff was obtained as golden crystals melting at 186° C. with decomposition. Incorporated in a gelatino silver iodo-bromide emulsion it imparts a band of sensitivity with a maximum at about 8100 Å.

*Example XXIV*

Preparation of the dyestuff of the probable formula:

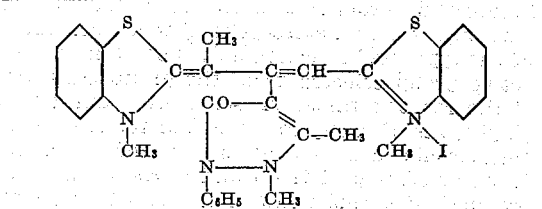

0.3 part of γ-(2-methyl-dihydrobenzthiazolylidene)-1:4'-isobutylidene-1'-phenyl-3'-methyl-5'-pyrazolone, 0.5 part of 1-methyl thiol benzthiazole and 1.5 parts of methyl-p-toluene sulphonate were mixed together and heated for two hours at 120–130° C. The mixture was then cooled and refluxed with 10 parts of pyridine for 45 minutes and then poured into potassium iodide solution. The product separated out and was removed by filtration, and washed with ethyl alcohol and ether. It was obtained as golden crystals melting at 285° C.

In the following claims, the expression "thioether group," "seleno-ether group" and "aminovinyl group" have been used for the sake of briefness but it is to be understood that the first two of these expressions include the corresponding aryl-, alkyl- and aralkyl-thioether and selenoether groups and that the third expression includes groups of the formula —(CH=CH)$_m$.NH$_2$, (where $m$ is 1, 2 or 3) and includes N-acyl, N-aryl and N-acylaryl substituted groups of this type.

What we claim is:

1. Process for the production of dyestuffs which comprises condensing a compound selected from the group consisting of the alkyl and aralkyl quaternary salts of compounds of the general formula:

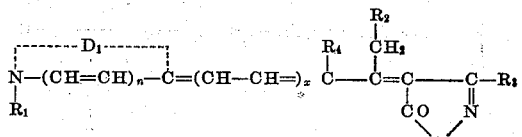

where R$_1$ is selected from the group consisting of alkyl and aralkyl groups.

R$_2$ and R$_4$ are selected from the group consisting of hydrogen, alkyl, aryl and aralkyl groups, R$_3$ is selected from the group consisting of hydrogen, alkyl, aralkyl, aryl and heterocyclic groups, A is selected from the group consisting of the divalent oxygen atom and divalent —NR$_5$— groups, where R$_5$ is selected from the group consisting of the hydrogen atom and monovalent hydrocarbon radicals D$_1$ is the residue of a heterocyclic nucleus of the type used in cyanine dyes $n$ is selected from the group consisting of 0 or 1 and $x$ is selected from the group consisting of 0, 1, 2 and 3, with a second quaternary salt of a heterocyclic nitrogen compound of the type used in cyanine dyes containing a reactive group selected from the group consisting of the reactive thioether, selenoether and aminovinyl types of group, in a position relative to the heterocyclic nitrogen atom selected from the group consisting of the α and γ positions.

2. Process for the production of dyestuffs which comprises condensing a compound selected from the group consisting of the alkyl and aralkyl quaternary salts of compounds of the general formula:

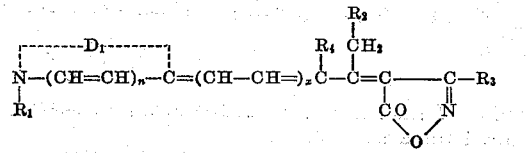

where R$_1$ is selected from the group consisting of alkyl and aralkyl groups,

R$_2$ and R$_4$ are selected from the group consisting of hydrogen, alkyl, aryl and aralkyl groups, R$_3$ is selected from the group consisting of hydrogen, alkyl, aralkyl, aryl and heterocyclic groups, D$_1$ is the residue of a heterocyclic nucleus of the type used in cyanine dyes, $n$ is selected from the group consisting of 0 and 1 and $x$ is selected from the group consisting of 0, 1, 2 and 3, with a second quaternary salt of a heterocyclic nitrogen compound of the type used in cyanine dyes containing a reactive group selected from the group consisting of the reactive thioether, selenoether and aminovinyl types of group, in a position relative to the heterocyclic nitrogen atom selected from the group consisting of the α and γ positions.

3. Process according to claim 2 wherein the second quaternary salt contains a CH₃S— group in a position selected from the group consisting of the α and γ positions to the heterocyclic nitrogen atom.

4. Process for the production of dyestuffs which comprises condensing a compound selected from the group consisting of the alkyl and aralkyl quaternary salts of compounds of the general formula:

$$\underset{R_1}{\overset{\overbrace{\hspace{1cm}D\hspace{1cm}}}{N}}-(CH=CH)_n-\underset{}{C}=(CH-CH=)_x\underset{}{C}-\underset{CO}{\overset{R_4}{C}}=\underset{\underset{\underset{R_5}{N}}{N}}{\overset{CH_2\,R_2}{C}}-C-R_3$$

where R₁ is selected from the group consisting of alkyl and aralkyl groups,

R₂ and R₄ are selected from the group consisting of hydrogen, alkyl, aryl and aralkyl groups, R₃ and R₅ are selected from the group consisting of hydrogen, alkyl, aralkyl, aryl and heterocyclic groups, D₁ is the residue of a heterocyclic nucleus of the type used in cyanine dyes, $n$ is selected from the group consisting of 0 and 1 and $x$ is selected from the group consisting of 0, 1, 2 and 3, with a secondary quaternary salt of a heterocyclic nitrogen compound of the type used in cyanine dyes containing a reactive group selected from the group consisting of the reactive thioether, selenoether and aminovinyl types of group, in a position relative to the heterocyclic nitrogen atom selected from the group consisting of the α and γ positions.

5. Process according to claim 4 wherein the second quaternary salt contains a CH₃S— group in a position selected from the group consisting of the α and γ positions to the heterocyclic nitrogen atom.

6. Process for the production of dyestuffs which comprises condensing a compound of the general formula:

$$\underset{R_1}{\overset{\overbrace{\hspace{1cm}D_1\hspace{1cm}}}{N}}-(CH=CH)_n-\underset{}{C}=(CH-CH=)_x\underset{}{C}-\underset{CO}{\overset{R_4}{C}}=\underset{\underset{O}{\diagdown N \diagup}}{\overset{CH_2\,R_2}{C}}-C-R_3$$

where R₁ is selected from the group consisting of alkyl and aralkyl groups,

R₂ and R₄ are selected from the group consisting of hydrogen, alkyl, aryl and aralkyl groups, R₃ is selected from the group consisting of hydrogen, alkyl, aralkyl, aryl and heterocyclic groups, D₁ is the residue of a heterocyclic nucleus of the type used in cyanine dyes, $n$ is selected from the group consisting of 0 and 1, and $x$ is selected from the group consisting of 0, 1, 2 and 3, with a heterocyclic nitrogen compound of the type used in cyanine dyes containing a reactive group selected from the group consisting of the reactive thioether, selenoether and aminovinyl types of group, in a position relative to the heterocyclic nitrogen atom selected from the group consisting of the α and γ positions in the presence of a sufficiency of a salt selected from the group consisting of alkyl and aralkyl salts to convert both the said compounds to quaternary salts.

7. Process for the production of dyestuffs which comprises condensing a compound of the general formula:

$$\underset{R_1}{\overset{\overbrace{\hspace{1cm}D_1\hspace{1cm}}}{N}}-(CH=CH)_n-\underset{}{C}=(CH-CH=)_x\underset{}{C}-\underset{CO}{\overset{R_4}{C}}=\underset{\underset{R_5}{N}}{\overset{CH_2\,R_2}{C}}-C-R_3$$

where R₁ is selected from the group consisting of alkyl and aralkyl groups,

R₂ and R₄ are selected from the group consisting of hydrogen, alkyl, aryl and aralkyl groups, R₃ and R₅ are selected from the group consisting of hydrogen, alkyl, aralkyl, aryl and heterocyclic groups, D₁ is the residue of a heterocyclic nucleus of the type used in cyanine dyes, $n$ is selected from the group consisting of 0 and 1 and $x$ is selected from the group consisting of 0, 1, 2 and 3 with heterocyclic nitrogen compound of the type used in cyanine dyes containing a reactive group selected from the group consisting of the reactive thioether, selenoether and amino vinyl types of group in a position relative to the heterocyclic nitrogen atom selected from the group consisting of the α and γ positions, in the presence of a sufficiency of a salt selected from the group consisting of alkyl and aralkyl salts to convert both the said compounds to quaternary salts.

8. Process for the production of dyestuffs which comprises condensing together one molecular equivalent of a compound of the general formula:

$$R_4-CH_2-\underset{}{C}=\underset{CO}{\overset{CH_2\,R_2}{C}}-\underset{\underset{R_5}{N}}{C}-R_3$$

(where R₂ and R₄ are selected from the group consisting of hydrogen, alkyl, aryl and aralkyl groups, and R₃ and R₅ are selected from the group consisting of hydrogen, alkyl, aralkyl, aryl and heterocyclic groups) and two molecular equivalents of a second heterocyclic nitrogen compound of the type used in cyanine dyes containing a reactive group selected from the group consisting of the reactive thioether, selenoether and amino vinyl types of group in a position relative to the heterocyclic nitrogen atom selected from the group consisting of the α and γ positions, in the presence of a sufficiency of a salt selected from the group consisting of alkyl and aralkyl salts to convert all the said compounds to quaternary salts.

9. Process according to claim 8 wherein the second heterocyclic nitrogen compound contains a CH₃S— group in a position selected from the group consisting of the α and γ positions to the heterocyclic nitrogen atom.

10. Dyestuffs of the general formula:

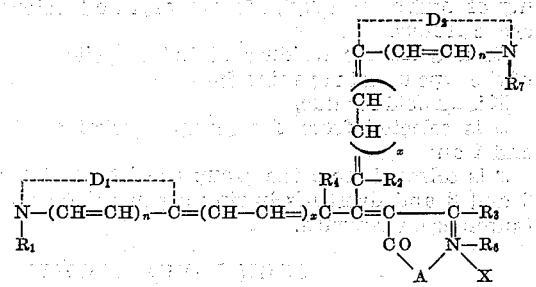

where $R_1$, $R_6$ and $R_7$ are selected from the group consisting of alkyl and aralkyl groups, $R_2$ and $R_4$ are selected from the group consisting of hydrogen, alkyl, aryl and aralkyl groups, $R_3$ is selected from the group consisting of hydrogen, alkyl, aralkyl, aryl and heterocyclic groups, A is selected from the group consisting of the divalent oxygen atom and divalent —$NR_5$— groups, where $R_5$ is selected from the group consisting of the hydrogen atom and monovalent hydrocarbon radicals, $D_1$ and $D_2$ are residues of heterocyclic nuclei of the type used in cyanine dyes, X is an acid residue, n is selected from the group consisting of 0 and 1 and x is selected from the group consisting of 0, 1, 2 and 3, and dyestuffs having a general formula tautomeric therewith.

11. Dyestuffs of the general formula:

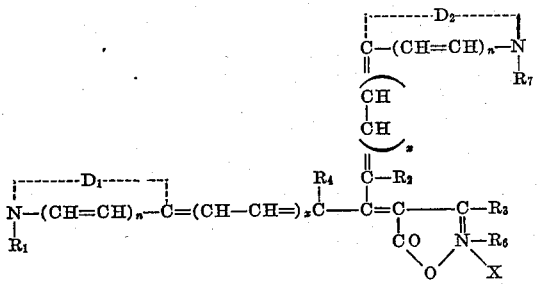

where $R_1$, $R_6$ and $R_7$ are selected from the group consisting of alkyl and aralkyl groups, $R_2$ and $R_4$ are selected from the group consisting of hydrogen, alkyl, aryl and aralkyl groups, $R_3$ is selected from the group consisting of hydrogen, alkyl, aralkyl, aryl and heterocyclic groups, $D_1$ and $D_2$ are residues of heterocyclic nuclei of the type used in cyanine dyes, X is an acid residue, n is selected from the group consisting of 0 and 1 and x is selected from the group consisting of 0, 1, 2 and 3 and dyestuffs having a general formula tautomeric therewith.

12. Dyestuffs of the general formula:

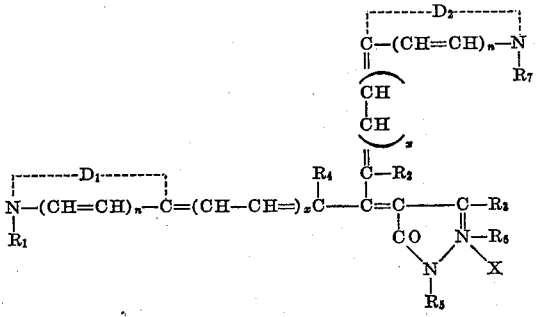

where $R_1$, $R_6$ and $R_7$ are selected from the group consisting of alkyl and aralkyl groups, $R_2$ and $R_4$ are selected from the group consisting of hydrogen, alkyl, aryl and aralkyl groups, $R_3$ and $R_5$ are selected from the group consisting of hydrogen, alkyl, aralkyl, aryl and heterocyclic groups, $D_1$ and $D_2$ are residues of heterocyclic nuclei of the type used in cyanine dyes, X is an acid residue, n is selected from the group consisting of 0 and 1 and x is selected from the group consisting of 0, 1, 2 and 3, and dyestuffs having a general formula tautomeric therewith.

13. Dyestuffs of the general formula:

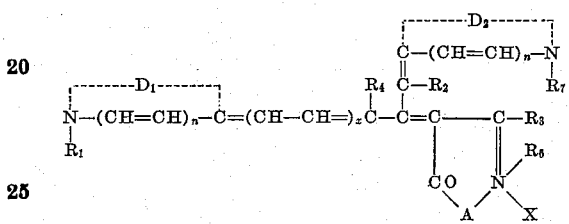

where $R_1$, $R_6$ and $R_7$ are selected from the group consisting of alkyl and aralkyl groups, $R_2$ and $R_4$ are selected from the group consisting of hydrogen, alkyl, aryl and aralkyl groups, $R_3$ is selected from the group consisting of hydrogen, alkyl, aralkyl, aryl and heterocyclic groups, A is selected from the group consisting of the divalent oxygen atom and divalent —$NR_5$— groups, where $R_5$ is selected from the group consisting of the hydrogen atom and monovalent hydrocarbon radicals, $D_1$ and $D_2$ are residues of heterocyclic nuclei of the type used in cyanine dyes, X is an acid residue, n is selected from the group consisting of 0 and 1 and x is selected from the group consisting of 0, 1, 2 and 3 and dyestuffs having a general formula tautomeric therewith.

14. Dyestuffs of the general formula:

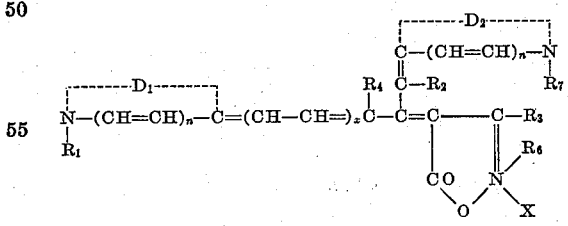

where $R_1$, $R_6$ and $R_7$ are selected from the group consisting of alkyl and aralkyl groups, $R_2$ and $R_4$ are selected from the group consisting of hydrogen, alkyl, aryl and aralkyl groups, $R_3$ is selected from the group consisting of hydrogen, alkyl, aralkyl, aryl and heterocyclic groups, $D_1$ and $D_2$ are residues of heterocyclic nuclei of the type used in cyanine dyes, X is an acid residue, n is selected from the group consisting of 0 and 1 and x is selected from the group consisting of 0, 1, 2 and 3 and dyestuffs having a general formula tautomeric therewith.

15. Dyestuffs of the general formula:

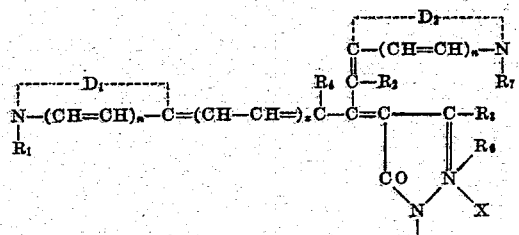

where $R_1$, $R_6$ and $R_7$ are selected from the group consisting of alkyl and aralkyl groups, $R_2$ and $R_4$ are selected from the group consisting of hydrogen, alkyl, aryl and aralkyl groups, $R_3$ and $R_5$ are selected from the group consisting of hydrogen, alkyl, aralkyl, aryl and heterocyclic groups, $D_1$ and $D_2$ are residues of heterocyclic nuclei of the type used in cyanine dyes, X is an acid residue, $n$ is selected from the group consisting of 0 and 1 and $x$ is selected from the group consisting of 0, 1, 2 and 3 and dyestuffs having a general formula tautomeric therewith.

JOHN DAVID KENDALL.
DOUGLAS JAMES FRY.